United States Patent
Philip et al.

(10) Patent No.: US 10,108,917 B2
(45) Date of Patent: *Oct. 23, 2018

(54) METADATA-DRIVEN AUDIT REPORTING SYSTEM

(71) Applicant: Oracle International Corporation, Redwood Shores, CA (US)

(72) Inventors: Deena Philip, Sunnyvale, CA (US); George Kellner, San Mateo, CA (US); Mohan Arthur, San Ramon, CA (US); Paul Johl, Centennial, WY (US)

(73) Assignee: Oracle International Corporation, Redwood Shores, CA (US)

( * ) Notice: Subject to any disclaimer, the term of this patent is extended or adjusted under 35 U.S.C. 154(b) by 546 days.

This patent is subject to a terminal disclaimer.

(21) Appl. No.: 14/200,226

(22) Filed: Mar. 7, 2014

(65) Prior Publication Data

US 2015/0074039 A1    Mar. 12, 2015

Related U.S. Application Data

(60) Provisional application No. 61/876,465, filed on Sep. 11, 2013.

(51) Int. Cl.
| | |
|---|---|
| *G06F 17/30* | (2006.01) |
| *G06Q 10/06* | (2012.01) |
| *G06F 21/62* | (2013.01) |
| *G06F 21/57* | (2013.01) |
| *G06F 21/64* | (2013.01) |

(52) U.S. Cl.
CPC ... *G06Q 10/0633* (2013.01); *G06F 17/30386* (2013.01); *G06F 17/30554* (2013.01); *G06F 21/577* (2013.01); *G06F 21/62* (2013.01); *G06F 21/64* (2013.01)

(58) Field of Classification Search
USPC .......................................................... 707/603
See application file for complete search history.

(56) References Cited

U.S. PATENT DOCUMENTS

| | | | |
|---|---|---|---|
| 5,574,898 A | 11/1996 | Leblang | |
| 5,806,074 A * | 9/1998 | Souder | G06F 17/30348 |

(Continued)

OTHER PUBLICATIONS

Oracle Audit Vault and Database Firewall, Developer's Guide, Release 121.1, E27779-02, Sep. 2013, http://docs.oracle.com/cd/E37100_01/doc.1211e27779.pdf.

(Continued)

*Primary Examiner* — Muluemebet Gurmu (74) *Attorney, Agent, or Firm* — Potomac Law Group, PLLC (57) ABSTRACT

A system is provided that reports audit data. The system defines metadata that defines a business object of an application module and an attribute of the business object as being auditable. The system further configures the metadata to enable auditing for the attribute of the business object. The system further generates audit data for the attribute of the business object based on the metadata, where the audit data includes a history of one or more modifications to the attribute of the business object. The system further stores the audit data within a shadow database table based on the metadata. The system further displays the audit data within a user interface.

17 Claims, 7 Drawing Sheets

(56) References Cited

U.S. PATENT DOCUMENTS

| | | | |
|---|---|---|---|
| 5,826,257 | A | 10/1998 | Snelling |
| 8,117,640 | B1 | 2/2012 | Moriconi et al. |
| 2003/0220940 | A1 | 11/2003 | Futoransky et al. |
| 2005/0193043 | A1 | 9/2005 | Hoover |
| 2006/0143220 | A1 | 6/2006 | Spencer |
| 2006/0265207 | A1 | 11/2006 | Gutz |
| 2007/0005665 | A1 | 1/2007 | Vaitzblit et al. |
| 2007/0011746 | A1 | 1/2007 | Malpani et al. |
| 2009/0150431 | A1 | 6/2009 | Schmidt |
| 2009/0210606 | A1 | 8/2009 | Feehrer |
| 2009/0240606 | A1 | 9/2009 | Oakman |
| 2009/0249446 | A1 | 10/2009 | Jenkins |
| 2009/0287737 | A1* | 11/2009 | Hammerly ........ G06F 17/30604 |
| 2010/0088738 | A1 | 4/2010 | Birnbach |
| 2010/0296235 | A1 | 11/2010 | Takemasa et al. |
| 2011/0302622 | A1 | 12/2011 | Bregman et al. |
| 2012/0096521 | A1 | 4/2012 | Peddada |
| 2013/0031067 | A1* | 1/2013 | Iyer .................. G06F 11/302 707/703 |
| 2014/0143263 | A1* | 5/2014 | Ritter ............... G06F 17/30303 707/756 |
| 2015/0073858 | A1 | 3/2015 | Philip et al. |
| 2015/0074039 | A1 | 3/2015 | Philip et al. |
| 2015/0074103 | A1 | 3/2015 | Philip et al. |
| 2015/0074747 | A1 | 3/2015 | Philip et al. |
| 2015/0095286 | A1 | 4/2015 | Spyker |

OTHER PUBLICATIONS

Oracle Audit Vault, Oracle Data Sheet, Copyright 2009, http://www.oracle.com/us/products/database/056885.pdf.
Oracle Audit Vault, An Oracle White Paper, Mar. 2009, http://www.oracle.com/us/products/database/056887.pdf.
Oracle E-Business Suite Integrated SOA Gateway Implementation Guide, Release 12.1 http://docs.oracle.com/cd/E18727_01/doc.121/e12169/T511175T513091.htm#sigig_secws_function (last visited Dec. 11, 2013).
Oracle Fusion Applications Security Guide, 11.1.7, E16689-07, http://docs.oracle.com/cloud/131/user_services/OASEC.pdf, Mar. 2013.
Salesforce, "Auditing", http://help.salesforce_com/apex/HTViewHelpDoc?id=security_overview_auditing.htm (last visited Dec. 11, 2013).
Salesforce, "Monitoring Login History", http://help.salesforce.com/apex/HTViewHelpDoc?id=users_login_history.htm&language=en_US (last visited Dec. 11, 2013).
Salesforce, "Tracking Field History", http://help.salesforce.com/apex/HTViewHelpDoc?id=tracking_field_history.htm&language=en_US (last visited Dec. 11, 2013).
Salesforce, "Monitoring Setup Changes", http://help.salesforce.com/apex/HTViewHelpDoc?id=admin_monitorsetup.htm&language=en_US (last visited Dec. 11, 2013).
Office Action dated Aug. 12, 2016 for U.S. Appl. No. 14/200,390.
Office Action dated Aug. 26, 2016 for U.S. Appl. No. 14/200,243.
Final Office Action dated Jan. 20, 2017 for U.S. Appl. No. 14/200,390.
Office Action dated Jul. 5, 2017 for U.S. Appl. No. 14/200,390.
Pstatz, CVS for Beginners Feb. 15, 2010, Wired, https://www.wired.com/2010/02/cvs_for_beginners/.
Non Final Office Action dated Sep. 18, 2017 for U.S. Appl. No. 14/200,243.
Final Office Action dated Dec. 1, 2017 for related U.S. Appl. No. 14/200,390.
Azad, A Visual Guide to Version Control [date unknown; earliest comment is dated Sep. 28, 2007], betterexplained.com, https://web.archive.o rg/web/20071 O 1 2204055/ https://better explained.com/articles/a-visual-guide-to-version-control/.
Chapter 2, Basic Version-Control Concepts [date unknown. Captured by archive.org on Nov. 9, 2006].
Rochkinds, sccs_invention 1 O Nov. 2015 9:49:32 EST, sourceforge.net, http://sccs.sourceforge.net/sccs_invention.html.
Sink, Source Control Howto Aug. 27, 2004, ericsink.com, http://ericsink.com/scm/source_control.html.

* cited by examiner

METADATA-DRIVEN AUDIT REPORTING SYSTEM

CROSS-REFERENCE TO RELATED APPLICATIONS

This application claims priority of U.S. Provisional Patent Application Ser. No. 61/876,465, filed on Sep. 11, 2013, the subject matter of which is hereby incorporated by reference.

FIELD

One embodiment is directed to a computer system, and more particularly, to a computer system that audits data.

BACKGROUND

A software application (or "application") is generally used for automating transactions related to processes of operations, such as business operations. Typically, processes include one or more transactions which may insert, update, or delete operations data (i.e., data related to the operations). The integrity and consistency of the operations data is generally very important, especially with regards to the creditability of records, service provisions, and maintenance of records. An application can be executed on a computer system in order to perform the operation processes.

In order to ensure integrity and consistency of the operations data, data auditing (or "auditing") of the operations data can be performed. Auditing is a process of tracking modifications to data, such as what data has been modified, who has made the modifications to the data, and when the modifications to the data were made. Further, auditing can maintain a history of modifications in chronological order so that operations data can be restored in case of any loss of data or data corruption. Auditing can be performed on the operations data for various reasons, such as system security, fault investigation, maintenance of history, or compliance with organizational policies or regulatory requirements. Moreover, auditing can help in analyzing a pattern of modifications in the operations data.

SUMMARY

One embodiment is a system that reports audit data. The system defines metadata that defines a business object of an application module and an attribute of the business object as being auditable. The system further configures the metadata to enable auditing for the attribute of the business object. The system further generates audit data for the attribute of the business object based on the metadata, where the audit data includes a history of one or more modifications to the attribute of the business object. The system further stores the audit data within a shadow database table based on the metadata. The system further displays the audit data within a single user interface.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, a metadata-driven audit reporting system is provided that can generate and display a report of audit data, where audit data includes a history of modifications that have been made to data in one or more software application modules (also identified as application modules), such as an operation that was performed on a business object of the application module, when the operation was performed, and how an attribute of the business object was modified. The audit reporting system can define metadata that is utilized to generate audit data. The audit reporting system can further provide a user interface mechanism for a user (such as an administrator user) to configure the metadata by selecting one or more business objects, and optionally selecting one or more specific attributes of each business object, to be audited. The user interface can display a structure of the auditable application modules, auditable business objects, and auditable attributes, and the user can select the appropriate business objects to be audited, as well as the appropriate attributes to be audited, using the user interface. Once a business object has been selected to be audited, the audit reporting system can capture any actions on the business object (including actions on base database tables that comprise the business object) as audit data, and store the audit data within one or more shadow database tables for reporting purposes. The audit reporting system can further combine the audit data generated from the aforementioned object-based audit framework with event-based audit data generated from an event-based audit framework that captures audit data through events that applications raise during their processing, where the event-based audit data is stored in a central event database table. The audit reporting system can subsequently display both the object-based audit data and the event-based audit data within a single user interface by abstracting away differences between the object-based audit data and the event-based audit data.

Previous audit systems are generally aligned with a physical data model of a database system that stores the data that is audited. These audit systems typically provide audit data that includes a list of name/value pairs and timestamps for inserted, updated or deleted rows in a table. However, these audit systems typically do not possess an awareness of how these database tables are related to business objects utilized by an application. Thus, there is typically not an automatic way to define an application context in these audit systems. In contrast, according to an embodiment of the invention, an audit reporting system utilizes an audit metadata model, which is a layer defined at an application layer, and which is above a physical database layer. Thus, the audit reporting system can represent audit data to the user in a manner similar or identical to the manner that the corresponding data is provided in the actual application. In other words, the audit data can be displayed in a business object context (e.g., the audit data can be associated with one or more business objects). The application context can be provided by the metadata that drives the audit framework of the audit reporting system. More specifically, according to an embodiment, the audit reporting system can define metadata that defines which attributes of a business object are to be audited. The audit reporting system can utilize this metadata to only generate and display audit data for the audited attributes of the business object. Thus, the audit data can be conformed at a business object level and an attribute level, rather than simply at a database table level.

Furthermore, previous audit systems are typically aligned with a single physical database layer, and thus, typically utilize a single audit data framework. According to the embodiment, the audit reporting system can generate audit data utilizing multiple audit frameworks, where the audit data can be stored in multiple different physical database layers with different database schemas or formats. The audit reporting system can further retrieve the audit data as unified audit data, despite the different database schemas or formats, and display the unified audit data within a single user interface.

Figure 1:
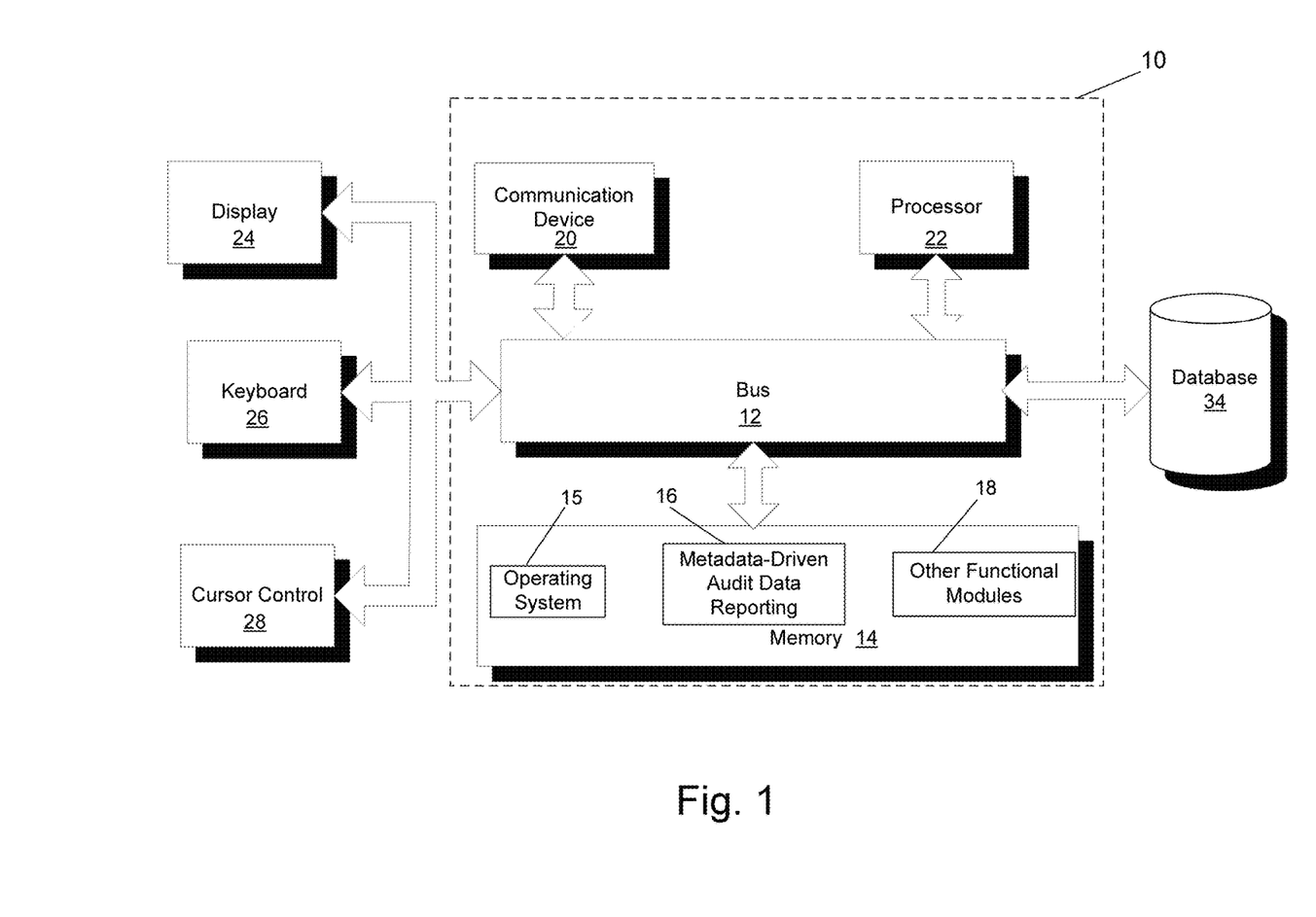
FIG. 1 illustrates a block diagram of a system that can implement an embodiment of the invention.

FIG. 1 illustrates a block diagram of a system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a metadata-driven audit data reporting module 16, as well as other functional modules 18. Operating system 15 can provide an operating system functionality for system 10. Metadata-driven audit data reporting module 16 can provide functionality for reporting audit data, as is described in more detail below. In certain embodiments, metadata-driven audit data reporting module 16 can comprise a plurality of modules that each provide specific individual functionality for reporting audit data, including, for example, a metadata definition module, a metadata configuration module, an audit data generation module, an audit data storage module and an audit data storage module. System 10 can also be part of a larger system. Thus, system 10 can include one or more additional functional modules 18 to include the additional functionality. For example, functional modules 18 may include modules that provide additional functionality, such as "Oracle Fusion" middleware products, or other "Oracle Fusion" products, from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
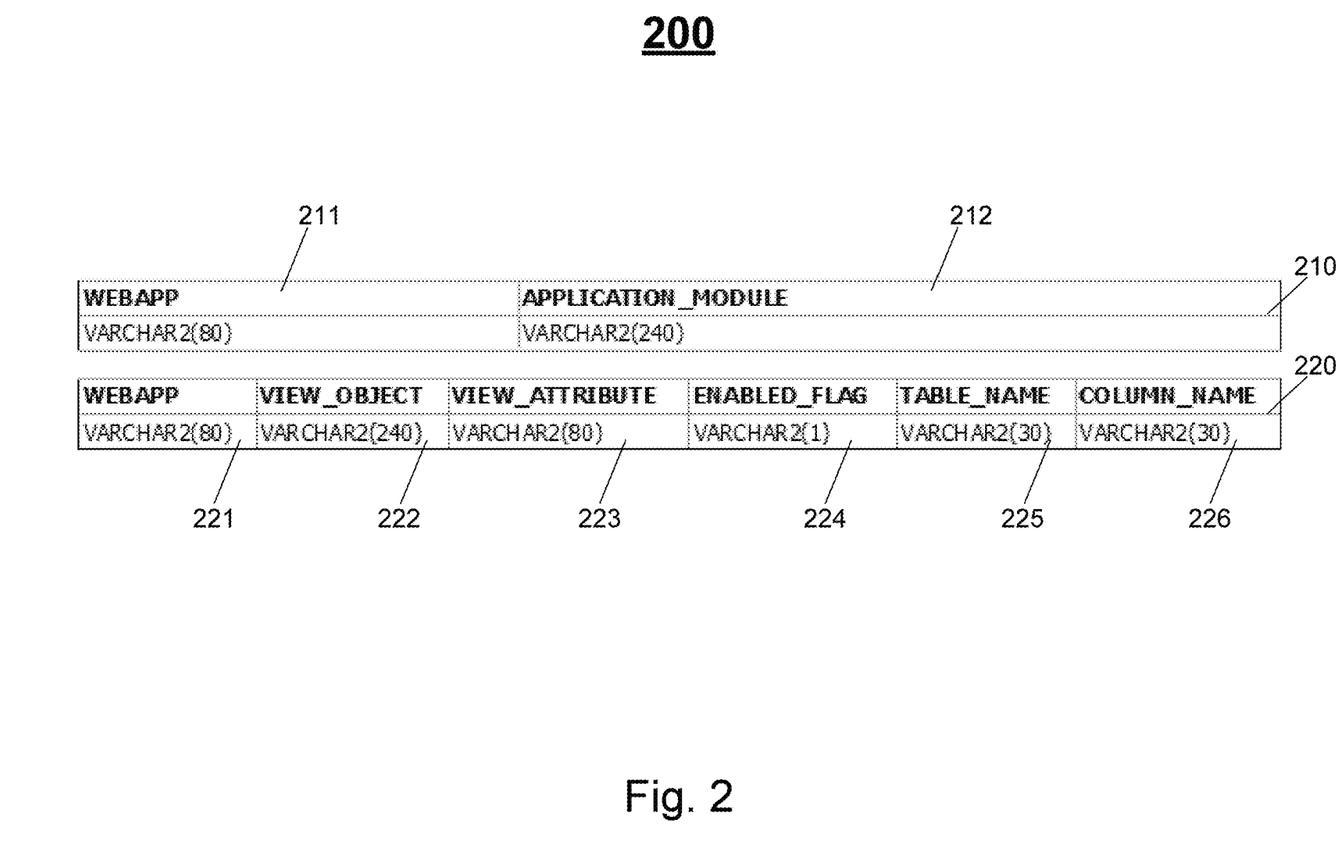
FIG. 2 illustrates an example metadata structure utilized to generate audit data for an audit reporting system, according to an embodiment of the invention.

FIG. 2 illustrates an example metadata structure 200 utilized to generate audit data for an audit reporting system, according to an embodiment of the invention. As previously described, audit data includes a history of modifications that have been made to data. For example, audit data can include specific operations (such as insert operations, update operations, and delete operations) that have been performed on data over a specific period of time. Audit data can further include a specific user that performed operations on data over a specific period of time. The metadata contained within metadata structure 200 can be utilized to generate audit data for an audit reporting system according to a metadata-driven object-based audit framework. More specifically, the metadata contained within metadata structure 200 can define business objects of an application module as being auditable. An application module is a collection of one or more computer-readable instructions for executing a specific functionality. A business object is a collection of data contained within one or more base database tables, where the data is logically related to a logical entity within an application module. When the metadata defines a business object as being auditable, the audit reporting system can expose the business object to a user (such as within a user interface), where the user can configure the business object to enable auditing, as is described below in greater detail.

Further, the metadata can define attributes of a business object as being auditable. An attribute is data contained within one or more fields of a base database table, where the base database table is associated with a business object. When the metadata defines an attribute as being auditable, the audit reporting system can expose the attribute to a user, where the user can configure the attribute to enable auditing, as is also described below in greater detail. The aforementioned metadata can be part of an object-based audit framework for an application module, where the object-based audit framework can be utilized in auditing transactions involving business objects (and their attributes) of the application module.

Metadata structure 200 includes two database schema tables, application module table 210 and attribute table 220. Application module table 210 and attribute table 220 each contain metadata that can define attributes of business objects of an application module, as well as the business objects themselves, as being auditable. These tables are referenced along with computer files that include computer program code to determine at runtime a complete configuration of which business objects and attributes are auditable. By defining attributes and/or business objects as being auditable, the metadata causes an audit reporting system to allow a user to configure the attributes and/or business objects in order to enable auditing, as is described below in greater detail. Thus, the metadata defines one or more attributes of one or more business objects as being auditable by an object-based audit framework.

Application module table 210 stores metadata that identifies one or more application modules of an application. More specifically, application module table 210 includes application column 211 and application module column 212. Application column 211 is a column (i.e., attribute) of application module table 210 that stores an application identifier that identifies an application. Application module column 212 is a column of application module table 210 that further stores an application module identifier that identifies an application module of an application.

Attribute table 220 further stores metadata that identifies one or more attributes associated with a business object. More specifically, attribute table 220 includes application column 221, business object column 222, attribute column 223, auditing enabled column 224, shadow database table name column 225, and shadow database column name column 226. Application column 221 stores an application identifier that identifies an application. Business object column 222 stores a business object identifier that identifies a business object of an application module. Attribute column 223 stores an attribute identifier that identifies an attribute of a business object. Auditing enabled column 224 stores an auditing enabled flag that identifies whether auditing is enabled for the attribute. Shadow database table name column 225 stores a shadow database table name that identifies a shadow database table that stores audit data, as is described below in greater detail. Shadow database column name column 226 stores a shadow database column name that identifies a column of the shadow database table that stores audit data, as is also described below in greater detail.

According to an embodiment, an application module of an application can be registered with application module table 210 by populating metadata within application module table 210, where the metadata includes an application identifier that identifies the application, and an application module identifier that identifies the application module of the application. In one embodiment, the application module can be registered with application module table 210 by passing the application identifier and the application module identifier to a service of the audit reporting system, where the service automatically populates metadata within application module table 210, where the metadata includes the application identifier and the application module identifier.

After an application module has been registered with application module table 210, a business object of the application module can be defined as being auditable by populating metadata within attribute table 220, where the metadata includes a business object identifier that identifies the business object. In one embodiment, a business object can be defined as being auditable by setting a value of a custom property of the business object to a value that indicates the business object is auditable. For example, as shown in the example computer program code, a custom property with the name "Auditable" can be set with a value "Y":

```
<Properties>
    <CustomProperties>
        <Property
            Name="Auditable"
            Value="Y"/>
    </CustomProperties>
</Properties>
```

According to the embodiment, by setting a custom property of the business object to a value that indicates the business object is auditable, the audit reporting system can automatically populate metadata within attribute table 220, where the metadata includes a business object identifier that identifies the business object.

Further, after a business object has been defined as being auditable, an attribute of the business object can be defined as being auditable based on computer files that include computer program code. Once an attribute is selected for audit in a runtime setup user interface, metadata is populated within attribute table 220, where the metadata includes an attribute identifier that identifies the attribute. In one embodiment, once a business object has been defined as auditable, all of its attributes are automatically defined as being auditable, unless an attribute is explicitly defined as not being auditable. According to this embodiment, an attribute can be defined as not being auditable by setting a value of a custom property of the attribute to a value that indicates the attribute is not auditable. For example, as shown in the example computer program code, a custom property with the name "Auditable" can be set with a value "N":

```
<ViewAttribute
    Name="Attribute1"
    IsUpdateable="false"
    PrecisionRule="true"
    EntityAttrName="Attribute1"
    EntityUsage="AttributeEO"
    AliasName="ROWID">
    <Properties>
        <CustomProperties>
            <Property
                Name="Auditable"
                Value="N"/>
        </CustomProperties>
        <SchemaBasedProperties>
            <DISPLAYHINT
                Value="Hide"/>
        </SchemaBasedProperties>
    </Properties>
</ViewAttribute>
```

According to the embodiment, if the custom property with the name "Auditable" is set with a value "Y," the attribute can be defined as being auditable if just the business object is selected for auditing. Further, if no custom property is defined for the attribute, a value of "Y" can be interpreted by the audit reporting system, and the attribute can be defined as being auditable but not preselected if the business object is enabled for auditing. Thus, according to the embodiment, by setting a custom property of the attribute to a value that indicates the attribute is auditable (or by not setting a custom property of the attribute to any value), the audit reporting system can automatically populate metadata within attribute table 220, where the metadata includes an attribute identifier that identifies the attribute.

Once metadata has been defined for, and populated within, application module table 210 and attribute table 220, a user of the audit reporting system can configure the metadata using a user interface of the audit reporting system, as is further described below in greater detail in conjunction with FIG. 4. According to an embodiment, a user-friendly display name can be defined for all application modules, business objects, and attributes. The display of a user-friendly display name can assist in the configuration of the metadata contained within application module table 210 and attribute table 220. Further, for application modules and business objects, a "tooltip" can be defined, where a tooltip is a text box that contains information, and where a tooltip can be displayed within the user interface when a user "hovers" a pointer, or other type of icon, over an object. The tooltip can display further information about the application module or business object that a user hovers the pointer over within the user interface. In one embodiment, a label property and/or a tooltip property can be defined for an application module, a business object, and/or an attribute. For example, as shown in the example computer program code, a label property and a tooltip property can be defined for a business object:

```
<Properties>
    <CustomProperties>
        <Property
            Name="Auditable"
            Value="Y"/>
    </CustomProperties>
    <SchemaBasedProperties>
        <LABEL
            ResId="ViewObjectVO_LABEL"/>
        <TOOLTIP
            ResId="ViewObjectVO_TOOLTIP"/>
    </SchemaBasedProperties>
</Properties>
<ResourceBundle>
    <XliffBundle
id="oracle.apps.fnd.applcore.audit.test.model.view.common.ViewObjectVOMsgBundle"/
>
</ResourceBundle>
```

As another example, as shown in the example computer program code, a label property can be defined for an attribute:

```
<ViewAttribute
    Name="TableName"
    PrecisionRule="true"
    EntityAttrName="TableName"
    EntityUsage="FndAuditAttributesEO"
    AliasName="TABLE_NAME">
    <Properties>
        <SchemaBasedProperties>
            <LABEL
                <ResId="TableName_LABEL"/>
        </SchemaBasedProperties>
    </Properties>
</ViewAttribute>
```

Further, according to the embodiment, the user interface of the audit reporting system can be used to search for a business object. Further, the business object can be searched using a key (i.e., an attribute) that may not be a primary key of the business object, by setting a value of a custom property of the attribute to a value that indicates the attribute is a user key for the business object. If not defined, the system can set the key to the first primary key. For example, as shown in the example computer program code, a custom property with the name "AUDIT_USER_KEY" can be set with a value "Y":

```
<ViewAttribute
    Name="TableName"
    IsUnique="true"
    IsNotNull="true"
    PrecisionRule="true"
    EntityAttrName="TableName"
    EntityUsage="FndTablesEO"
    AliasName="TABLE_NAME">
    <Properties>
        <CustomProperties>
            <Property
                Name="AUDIT_USER_KEY"
                Value="Y"/>
        </CustomProperties>
    </Properties>
</ViewAttribute>
```

According to the embodiment, by setting a custom property of the attribute of the business object to a value that indicates the attribute is a user key of the business object, the business object can be searched upon within the user interface using the attribute.

Further, the metadata included within attribute table 220 can be configured. More specifically, an auditing enabled flag that is associated with an attribute can be set to a value that identifies that auditing is enabled for the attribute within attribute table 220. By setting the auditing enabled flag to a value that identifies that auditing is enabled for the attribute, the audit reporting system can generate audit data for the attribute, and can display the audit data within a user interface. An auditing enabled flag for an attribute can be set to a value that identifies that auditing is enabled for the attribute using a user interface of the audit reporting system, as is further described below in greater detail in conjunction with FIG. 4. In one embodiment, when an auditing enabled flag for an attribute is set to a value that identifies that auditing is enabled for the attribute, a shadow database table name that identifies a shadow database table that stores audit data can also be defined, and a shadow database column name that identifies a column of the shadow database table that stores audit data can also be defined. Further, the generation of the audit data is further described below in greater detail in conjunction with FIG. 5, and the displaying of the audit data is further described below in greater detail in conjunction with FIG. 6.

Figure 3:
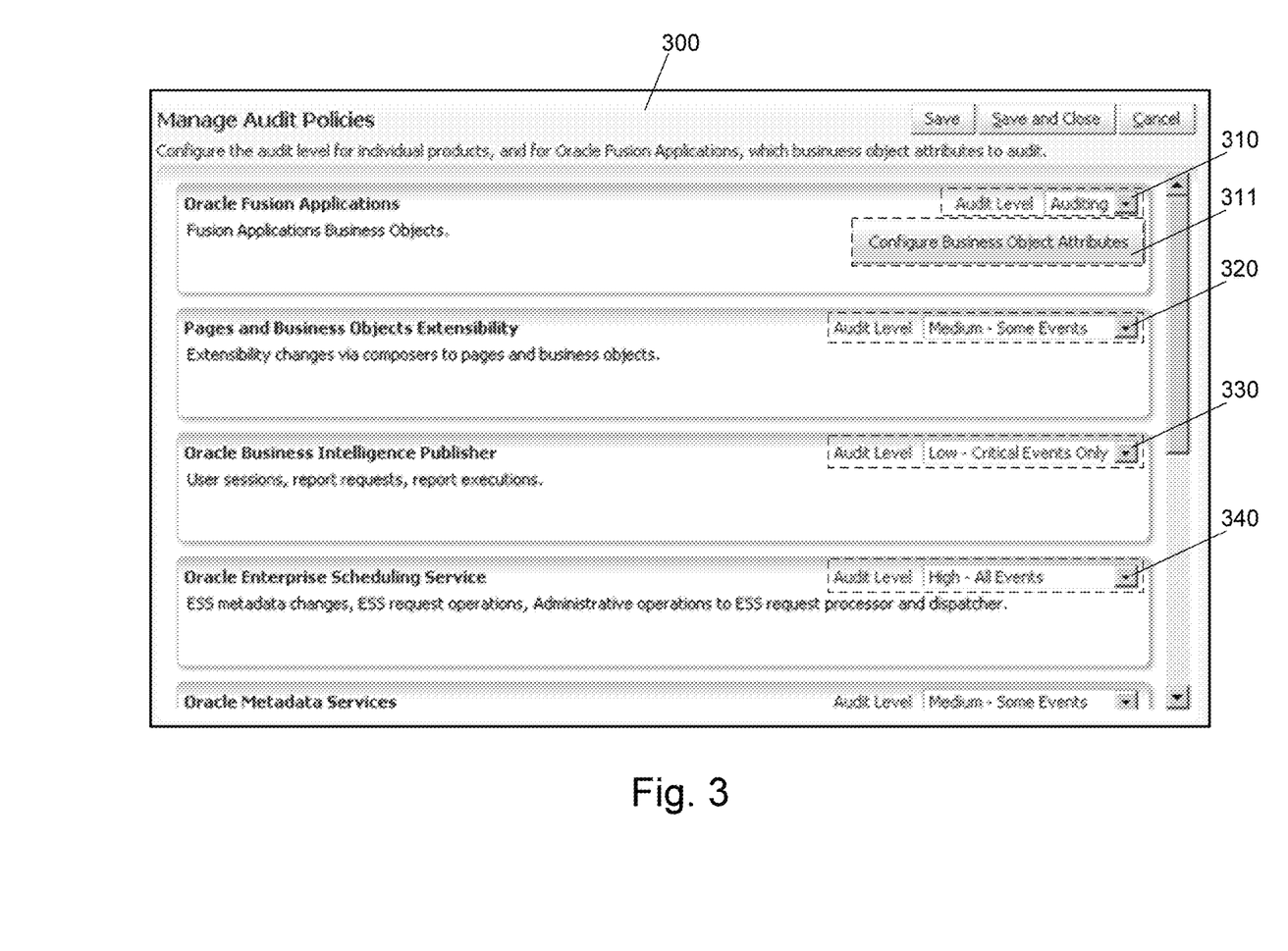
FIG. 3 illustrates an example audit configuration user interface, according to an embodiment of the invention.

FIG. 3 illustrates an example audit configuration user interface 300, according to an embodiment of the invention. According to the embodiment, audit configuration user interface 300 allows a user to configure the auditing of data by an audit reporting system. More specifically, audit configuration user interface 300 allows a user to configure the auditing of data for an application using a metadata-driven object-based audit framework, and to also configure the auditing of data for an application using an event-based audit framework.

A metadata-driven object-based audit framework is previously described in conjunction with FIG. 2. An event-based audit framework involves the generation of audit data by the audit reporting system in response to an event within an application. An "event" is an action or occurrence detected by the application. An example of an event is a login failure, where the login failure has an event that records a user, a time, and an event identifier indicating that the login attempt was a failed login attempt. Upon the occurrence of an event, the audit reporting system can capture data and convert the captured data into audit data. The audit reporting system can further store the audit data into an event database table. The event database table can be separate from the shadow database table utilized by the metadata-driven object-based audit framework, and can have a format that is different from the format of the shadow database table. The audit reporting system can subsequently combine the audit data stored within the event database table with the audit data stored within the shadow database table, despite the difference in the two formats, and can display the audit data within a user interface. The two types of audit data can be displayed within the user interface using a single format.

According to the embodiment, a user can enable or disable auditing for an application according to a metadata-driven object-based audit framework using audit level drop-down list 310. By interacting with audit level drop-down list 310, the user can cause the audit reporting system to configure metadata, such as the metadata stored in metadata structure 200 of FIG. 2. Further, a user can enable or disable auditing for one or more specific attributes of one or more specific business objects according to the metadata-driven object-based audit framework using business object attribute configuration button 311. By interacting with business object attribute configuration button 311, the user can cause the audit reporting system to configure metadata, such as the metadata stored in metadata structure 200 of FIG. 2, for one or more specific attributes of one or more specific business objects. The configuration of metadata for one or more specific attributes of one or more specific business objects is further described below in greater detail in conjunction with FIG. 4. Further, in an alternate embodiment, audit level drop-down list 310 of audit configuration user interface 300 can enable or disable auditing for all business objects for the selected application that have been defined as being auditable.

According to the embodiment, a user can enable, disable, or configure auditing for an application according to an event-based audit framework using one of audit level drop-down lists 320, 330, and 340. More specifically, a user can set an audit level to one of a plurality of audit levels using one of audit level drop-down lists 320, 330, and 340, where each audit level defines an event type (or event types) that trigger a capture of data associated with the event, and the conversion of the captured data into audit data, which is subsequently stored within the event database table. In one example embodiment, the plurality of audit levels can include the following audit levels: (1) High (captures all events); (2) Low (only captures critical events); (3) Medium (only captures critical events and certain non-critical events); or (4) None (does not capture any events).

Figure 4:
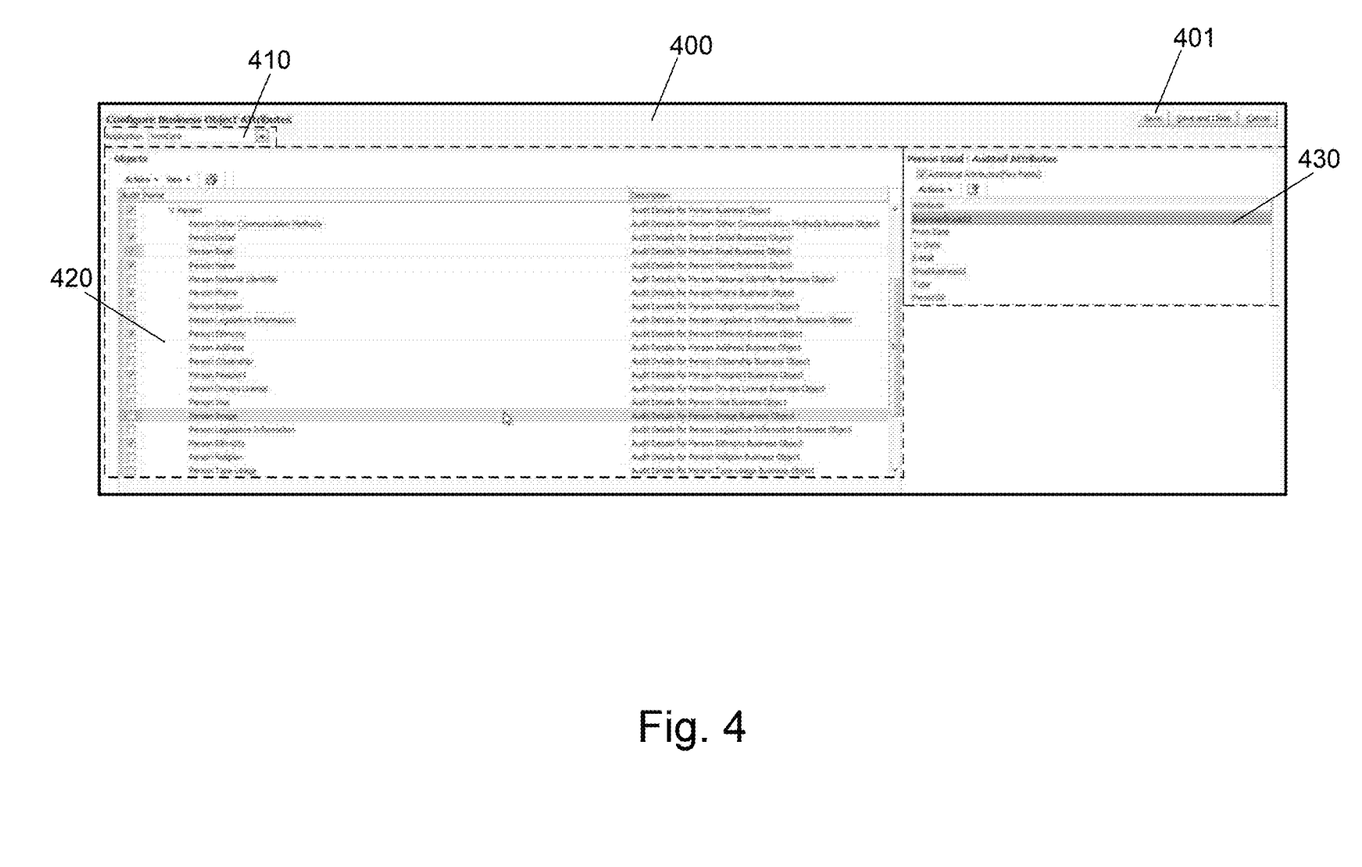
FIG. 4 illustrates an example business object audit configuration user interface, according to an embodiment of the invention.

FIG. 4 illustrates an example business object audit configuration user interface 400, according to an embodiment of the invention. According to the embodiment, business object audit configuration user interface 400 allows a user to configure metadata for one or more specific attributes of one or more specific business objects. By configuring metadata for one or more attributes, the user can enable or disable auditing for the one or more attributes. Further, the configuration of the metadata for an attribute can include setting a value of an auditing enabled flag that is associated with an attribute to either: (1) a value that identifies that auditing is enabled for the attribute; or (2) a value that identifies that auditing is disabled for the attribute. In one embodiment, business object audit configuration user interface 400 can be displayed upon an interaction with business object attribute configuration button 311 of FIG. 3.

According to the illustrated embodiment, business object audit configuration user interface 400 includes application drop-down list 410, business object window 420 and attribute window 430. A user can select an application using application drop-down list 410. In response to the selection of an application using application drop-down list 410, business object window 420 displays all business objects for the selected application that have been defined as being auditable. The business objects can be defined as being auditable based on metadata, such as metadata included within metadata structure 200 of FIG. 2. For each business object displayed within business object window 420, a user can "check" or "uncheck" an auditing enabled flag. By "checking" an auditing enabled flag for a business object, a user can cause one or more attributes of the business object to be enabled for auditing. By "unchecking" an auditing enabled flag for the business object, the user can cause one or more attributes of the business object not to be enabled for auditing. Upon "clicking" on save button 401, the audit reporting system can configure metadata, such as metadata included within metadata structure 200 of FIG. 2, based on the user's selections.

Further, a user can select a business object displayed within business object window 420. In response to the selection of a business object within business object window 420, attribute window 430 displays all attributes for the selected business object that have been defined as being auditable. The attributes can be defined as being auditable based on metadata, such as metadata included within metadata structure 200 of FIG. 2. For each attribute displayed within attribute window 430, a user can select or unselect the attribute. By selecting the attribute, the user can cause the attribute to be enabled for auditing. By unselecting the attribute, the user can cause the attribute not to be enabled for auditing. Upon "clicking" on save button 401, the audit reporting system can configure metadata, such as metadata included within metadata structure 200 of FIG. 2, based on the user's selections.

Further, in an alternate embodiment, one or more attributes can be flex fields. A flex field is a set of placeholder fields, also identified as segments, which are associated with a business object, and where a segment captures a single atomic value, which is represented in the base database table as a single column. Also, in an alternate embodiment, a user can initiate a tracking of a flex field attribute by the audit reporting system (also identified as synchronizing an attribute) using a synchronize button (not illustrated in FIG. 4), since flex fields may be defined at runtime.

Figure 5:
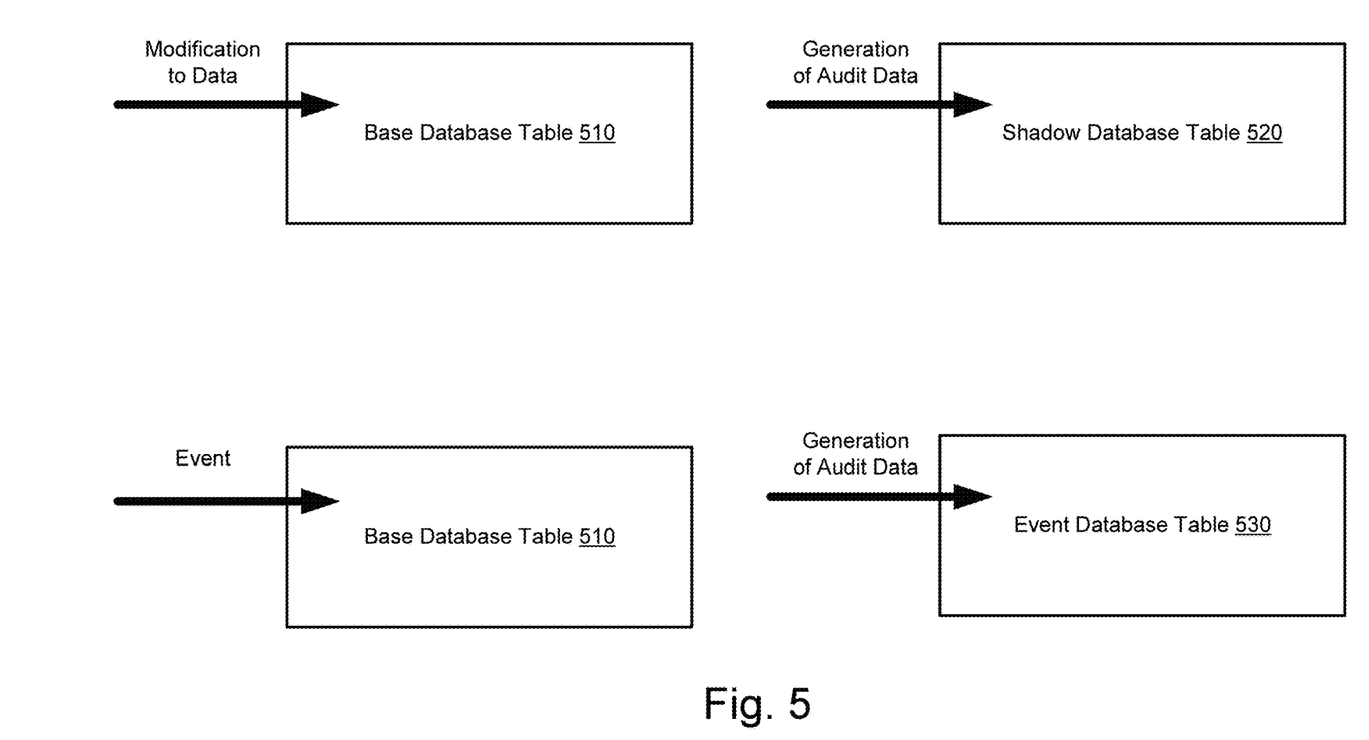
FIG. 5 illustrates a generation of audit data, according to an embodiment of the invention.

FIG. 5 illustrates a generation of audit data, according to an embodiment of the invention. In accordance with a metadata-driven object-based audit framework, for every base database table (such as base database table 510) that is associated with a business object that is enabled for auditing, a shadow database table (such as shadow database table 520) is created. Shadow database table 520 can include an identical set of columns as base database table 510, and can include one or more additional columns for internal usage purposes. Further, upon creation of shadow database table 520, metadata (such as metadata included within metadata structure 200 of FIG. 2) can be configured to include a shadow database table name that identifies shadow database table 520, and a shadow database column name that identifies a column of shadow database table 520. During execution of an application, in response to a modification to data stored within base database table 510 (such as an insert operation, a delete operation, or an update operation), audit data is generated and stored within shadow database 520. Such audit data can include the data stored within base database table 510 prior to the modification, the data stored within base database table 510 after the modification, and/or a user identifier that identifies a specific user that performed the modification. The generation and storage of audit data within shadow database 520 can be accomplished through one or more application program interfaces ("APIs"), as understood by one of ordinary skill in the relevant art.

Further, in accordance with an event-based audit framework, a single event database table (such as event database table 530) is created for all base database tables (such as base database table 510). During execution of an application, in response to an event occurrence at base database table 510 (such as a login failure event), audit data is generated and stored within event database table 530. Such audit data can include the data stored within base database table 510 prior to the event, the data stored within base database table 510 after the event, an event identifier that identifies the event, a date, a time, and/or a user identifier that identifies a specific user that initiated the event. The generation and storage of audit data within event database 530 can be accomplished through one or more application program interfaces ("APIs"), as understood by one of ordinary skill in the relevant art.

Figure 6:
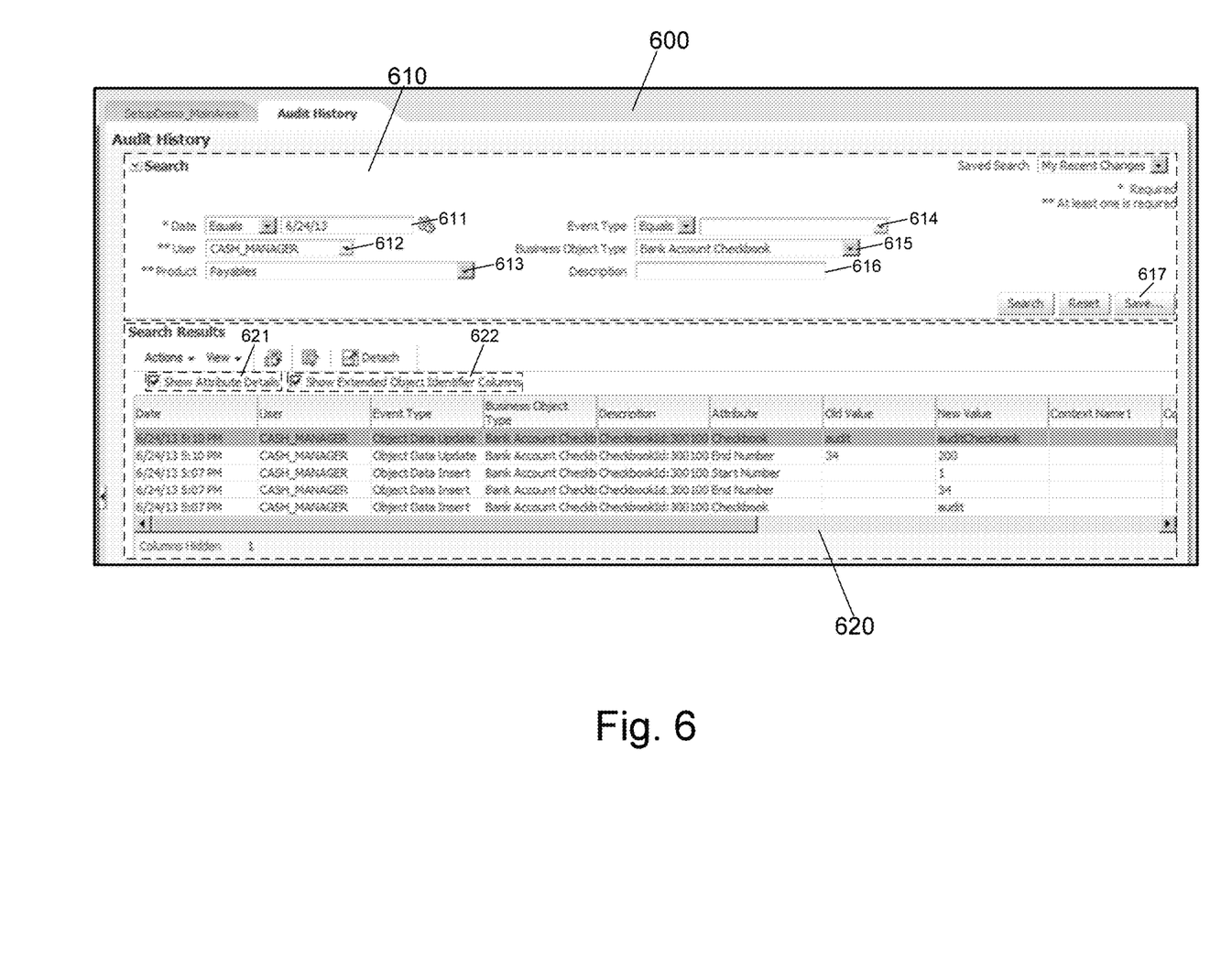
FIG. 6 illustrates an example audit report user interface, according to an embodiment of the invention.

FIG. 6 illustrates an example audit report user interface 600, according to an embodiment of the invention. According to the embodiment, the audit reporting system retrieves audit data from one or more shadow database tables, and displays the retrieved audit data within audit report user interface 600. In certain embodiments, the audit reporting system also retrieves audit data from an event database table, combines the audit data retrieved from the event database table with the audit data retrieved from the one or more shadow database tables, and displays the combined audit data within audit report user interface 600. According to the embodiment, the audit reporting system abstracts out the differences in the different formats of the audit data stored within the one or more shadow database tables and the audit data stored within the event database table, and displays the combined audit data within audit report user interface 600 using a single format.

According to an embodiment, a user can perform a search of the audit data using search window 610 of audit report user interface 600. More specifically, a user can perform a search of the audit data: (1) by entering a date or date range within date field 611; (2) by entering a user identifier within user field 612; (3) by entering a product identifier within product field 613; (4) by entering an event type within event type field 614; (5) by entering a business object type within business object type field 615; and/or (6) by entering a description within description field 616. Based one or more entered values within search window 610, the audit reporting system can retrieve and display audit data that includes the one or more entered values within search results window 620. If show attribute details checkbox 621 is enabled, search results window 620 can display attributes that have been modified, including old and new values for the attributes. Further, if show extended object identifier columns checkbox 622 is enabled, search results window 620 can display context columns that can help identify the business object that the attributes are associated with.

Figure 7:
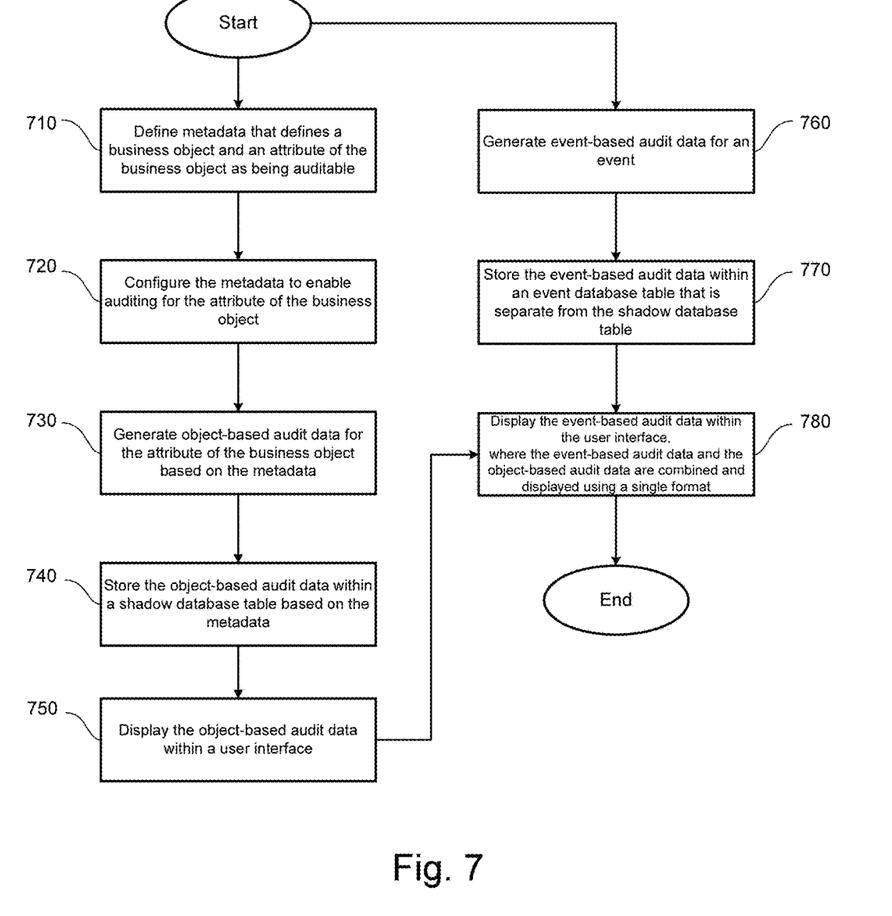
FIG. 7 illustrates a flow diagram of the functionality of a metadata-driven audit data reporting module, according to an embodiment of the invention.

FIG. 7 illustrates a flow diagram of the functionality of a metadata-driven audit data reporting module (such as metadata-driven audit data reporting module 16 of FIG. 1), according to an embodiment of the invention. In one embodiment, the functionality of the flow diagram of FIG. 7 is implemented by software stored in memory or other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some, or all, of the functionality may be omitted.

The flow begins, and proceeds to 710. Alternatively, the flow proceeds to 760 rather than 710. At 710, metadata is defined, where the metadata defines a business object of an application module and an attribute of the business object as being auditable. In certain embodiments, the metadata includes a business object identifier that identifies the business object of the application module, an attribute identifier that identifies the attribute of the business object, an auditing enabled flag that identifies whether auditing is enabled for the attribute, a shadow database table name that identifies the shadow database table, and a shadow database column name that identifies a column of the shadow database table. Further, in certain embodiments, the business object includes data contained within one or more base tables.

In some embodiments, a value of a property of the business object is set to a value that indicates the business object is auditable, and a value of a property of the attribute is set to a value that indicates the attribute is auditable. Further, in these embodiments, a business object identifier that identifies the business object and an attribute identifier that identifies the attribute of the business object are populated within the metadata based on the value of the property of the business object and the value of the property of the attribute. The flow proceeds to 720.

At 720, the metadata is configured to enable auditing for the attribute of the business object. In certain embodiments, the auditing enabled flag of the metadata is set to a value that indicates that auditing is enabled for the attribute. The flow proceeds to 730.

At 730, object-based audit data is generated for the attribute of the business object based on the metadata. The object-based audit data includes a history of one or more modifications to the attribute of the business object. In certain embodiments, the one or more modifications include one or more modifications to data contained with a base database table of the one or more base database tables of the business object. Further, in certain embodiments, the object-based audit data is only generated when the auditing enabled flag of the metadata is set to a value that indicates that auditing is enabled. The flow then proceeds to 740.

At 740, the object-based audit data is stored within a shadow database table based on the metadata. In certain embodiments, the shadow database table is separate from the one or more base database tables. Further, in certain embodiments, the object-based audit data is stored within the shadow database table that is identified by the shadow database table name of the metadata and stored within the column of the shadow database table identified by the shadow database table column name of the metadata. The flow then proceeds to 750.

At 750, the object-based audit data is displayed within a user interface. In certain embodiments, a search criteria is received, and the object-based audit data that satisfies the search criteria is displayed within the user interface. Further, in some of these embodiments, the search criteria includes at least one of: a date or a date range, and a user identifier or a product identifier. The flow then proceeds to 780.

At 760, event-based audit data is generated for an event of a separate application. The flow proceeds to 770.

At 770, the event-based audit data is stored within an event database table that is separate from the shadow database table, where a format of the event database table is different from a format of the shadow database table. The flow proceeds to 780.

At 780, the event-based audit data is displayed within the user interface, where the event-based audit data and the object-based audit data are combined and displayed using a single format. The flow then ends.

Thus, an audit reporting system is provided that can be metadata-driven, where the metadata can determine which attributes of a business object are audited, and thus, can determine the audit data that is generated and displayed. The use of the metadata allows for increased flexibility in auditing, and further allows for easy configuration of which attributes of a business object are audited. This results in the audit reporting system providing audit data with an application context. Further, the audit reporting system can provide for the display of metadata-driven object-based audit data and event-based audit data within a single user interface. This allows for the leveraging of both a metadata-driven object-based audit framework and an event-based audit framework within the audit reporting system, while maintaining a single unified user interface that is easy for an end user to read and interpret. This also allows the audit reporting system not to be operably coupled to a single database table schema or format. Thus, the audit reporting system can utilize multiple database table schemas and formats.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to report audit data comprising a history of modifications made to data in a software application, the reporting comprising:
    defining metadata for an attribute of a business object of the software application stored in a base database table, the metadata including:
        a business object identifier,
        an attribute identifier,
        an auditing enabled flag that identifies whether auditing is enabled for the attribute,
        a shadow database table name that identifies a shadow database table associated with the base database table, and
        a shadow database column name that identifies a column of the shadow database table associated with the attribute of the business object;
    configuring the metadata to enable auditing for the attribute of the business object, including setting the auditing enabled flag of the metadata to a value that indicates that auditing is enabled for the attribute;
    during execution of the software application and in response to a modification to data stored within the base database table, generating first audit data for the attribute of the business object only when the auditing enabled flag of the metadata is set to the value that indicates that auditing is enabled, the first audit data including a history of one or more modifications to the attribute of the business object;
    storing the first audit data for the attribute of the business object within the shadow database table identified by the shadow database table name and the shadow database column name, the first audit data comprising data stored within the base database table prior to the modification and data stored within the base database table after the modification;
    during execution of the software application and in response to an event occurrence at the base database table, generating second audit data and storing the second audit data in an event database table, wherein the event comprises a login failure event of the software application and wherein the event database table has a different format than the shadow database table; and
    displaying the first audit data and the second audit data within a user interface using a single format for the first audit data and the second audit data.

2. The non-transitory computer-readable medium of claim 1, wherein the storing the second audit data comprises data stored within the base database table prior to the event, data stored within the base database table after the event, and an event identifier that identifies at least one of the event, a date, a time or a user identifier that identifies a specific user that initiated the event.

3. The non-transitory computer-readable medium of claim 1,
wherein the one or more modifications to the attribute of the business object comprise one or more modifications to data contained within the base database table; and
wherein the shadow database table is separate from the base database table.

4. The non-transitory computer-readable medium of claim 1, the displaying the audit data within the user interface further comprising:
receiving a search criteria; and
displaying the audit data that satisfies the search criteria within the user interface.

5. The non-transitory computer-readable medium of claim 4, wherein the search criteria comprises at least one of: a date or a date range; and a user identifier or a product identifier.

6. The non-transitory computer-readable medium of claim 1, the defining the metadata further comprising:
setting a value of a property of the business object to a value that indicates the business object is auditable;
setting a value of a property of the attribute to a value that indicates the attribute is auditable; and
populating the business object identifier and the attribute identifier within the metadata based on the value of the property of the business object and the value of the property of the attribute.

7. A computer-implemented method for reporting audit data comprising a history of modifications made to data in a software application, the computer-implemented method comprising:
defining metadata for an attribute of a business object of the software application stored in a base database table, the metadata including:
a business object identifier,
an attribute identifier,
an auditing enabled flag that identifies whether auditing is enabled for the attribute,
a shadow database table name that identifies a shadow database table associated with the base database table, and
a shadow database column name that identifies a column of the shadow database table associated with the attribute of the business object;
configuring the metadata to enable auditing for the attribute of the business object, including setting the auditing enabled flag of the metadata to a value that indicates that auditing is enabled for the attribute;
during execution of the software application and in response to a modification to data stored within the base database table, generating first audit data for the attribute of the business object only when the auditing enabled flag of the metadata is set to the value that indicates that auditing is enabled, the first audit data including a history of one or more modifications to the attribute of the business object
storing the first audit data for the attribute of the business object within the shadow database table identified by the shadow database table name and the shadow database column name, the first audit data comprising data stored within the base database table prior to the modification and data stored within the base database table after the modification;
during execution of the software application and in response to an event occurrence at the base database table, generating second audit data and storing the second audit data in an event database table, wherein the event comprises a login failure event of the software application and wherein the event database table has a different format than the shadow database table; and
displaying the first audit data and the second audit data within a user interface using a single format for the first audit data and the second audit data.

8. The computer-implemented method of claim 7, wherein the storing the second audit data comprises data stored within the base database table prior to the event, data stored within the base database table after the event, and an event identifier that identifies at least one of the event, a date, a time or a user identifier that identifies a specific user that initiated the event.

9. The computer-implemented method of claim 7,
wherein the one or more modifications to the attribute of the business object comprise one or more modifications to data contained within the base database table;
wherein the shadow database table is separate from the base database table.

10. A system for reporting audit data comprising a history of modifications made to data in a software application, the system comprising:
a processor; and
a memory, coupled to the processor, storing a metadata definition module, a metadata configuration module, an audit data generation module, an audit data storage module and an audit data display module,
wherein:
the metadata definition module, when executed by the processor, defines metadata for an attribute of a business object of the software application stored in a base database table, the metadata including:
a business object identifier,
an attribute identifier,
an auditing enabled flag that identifies whether auditing is enabled for the attribute,
a shadow database table name that identifies a shadow database table associated with the base database table, and
a shadow database column name that identifies a column of the shadow database table associated with the attribute of the business object;
the metadata configuration module, when executed by the processor, configures the metadata to enable auditing for the attribute of the business object, including setting the auditing enabled flag of the metadata to a value that indicates that auditing is enabled for the attribute;
the audit data generation module, when executed by the processor, during execution of the software application and in response to a modification to data stored within the base database table, generates first audit data for the attribute of the business object only when the auditing enabled flag of the metadata is set to the value that indicates that auditing is enabled, the first audit data including a history of one or more modifications to the attribute of the business object;
the audit data storage module, when executed by the processor, stores the first audit data for the attribute of the business object within the shadow database table identified by the shadow database table name and the shadow database column name, the first audit data comprising data stored within the base database table prior to the modification and data stored within the base database table after the modification and during execution of the software application and in response to an event occurrence at the base database table, generating second audit data and storing the second audit data in an event database table, wherein the event comprises a login failure event of the software application and wherein the event database table has a different format than the shadow database table; and the audit data display module, when executed by the processor, displays the first audit data and the second audit data within a user interface using a single format for the first audit data and the second audit data.

11. The system of claim 10, wherein storing the second audit data comprises data stored within the base database table prior to the event, data stored within the base database table after the event, and an event identifier that identifies at least one of the event, a date, a time or a user identifier that identifies a specific user that initiated the event.

12. The non-transitory computer-readable medium of claim 1, wherein the attribute comprises a flex field comprising a set of segments associated with the business object, each segment capturing a single atomic value that is represented in the base database table as a single column.

13. The computer-implemented method of claim 7, wherein the attribute comprises a flex field comprising a set of segments associated with the business object, each segment capturing a single atomic value that is represented in the base database table as a single column.

14. The system of claim 10, wherein the attribute comprises a flex field comprising a set of segments associated with the business object, each segment capturing a single atomic value that is represented in the base database table as a single column.

15. The non-transitory computer-readable medium of claim 1, further comprising determining an audit level of the event occurrence, wherein the determined audit level determines whether the second audit data is stored in the event database table.

16. The computer-implemented method of claim 7, further comprising determining an audit level of the event occurrence, wherein the determined audit level determines whether the second audit data is stored in the event database table.

17. The system of claim 10, further comprising determining an audit level of the event occurrence, wherein the determined audit level determines whether the second audit data is stored in the event database table.

* * * * *

UNITED STATES PATENT AND TRADEMARK OFFICE
CERTIFICATE OF CORRECTION

PATENT NO. : 10,108,917 B2
APPLICATION NO. : 14/200226
DATED : October 23, 2018
INVENTOR(S) : Philip et al.

Page 1 of 1

It is certified that error appears in the above-identified patent and that said Letters Patent is hereby corrected as shown below:

In the Claims

Column 15, Line 60, Claim 7, delete "object" and insert -- object; --, therefor.

Signed and Sealed this
Thirty-first Day of December, 2019

Andrei Iancu
*Director of the United States Patent and Trademark Office*